(12) United States Patent
Bradford

(10) Patent No.: US 10,458,373 B2
(45) Date of Patent: Oct. 29, 2019

(54) SYSTEM INCLUDING OXYGEN SEPARATION DEVICE

(71) Applicant: Tenneco Automotive Operating Company Inc., Lake Forest, IL (US)

(72) Inventor: Michael C. Bradford, Chelsea, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 16 days.

(21) Appl. No.: 15/848,390

(22) Filed: Dec. 20, 2017

(65) Prior Publication Data

US 2019/0186436 A1   Jun. 20, 2019

(51) Int. Cl.
  B01D 53/22 (2006.01)
  F02M 27/04 (2006.01)
  B01D 71/02 (2006.01)
  C01B 13/02 (2006.01)
  (Continued)

(52) U.S. Cl.
  CPC ........... F02M 27/04 (2013.01); B01D 53/228 (2013.01); B01D 71/024 (2013.01); C01B 13/0251 (2013.01); F02M 31/14 (2013.01); F17C 11/00 (2013.01); F17C 2205/0323 (2013.01); F17C 2221/011 (2013.01)

(58) Field of Classification Search
  CPC ...... F02M 27/04; F02M 31/14; B01D 53/228; B01D 71/024; C01B 13/0251; F17C 11/00; F17C 2205/0212; F17C 2221/011
  USPC .................................. 123/539, 585
  See application file for complete search history.

(56) References Cited

U.S. PATENT DOCUMENTS

| 3,961,609 A | 6/1976 | Gerry |
| 5,051,113 A * | 9/1991 | Nemser .................. B01D 53/22 123/26 |
| 5,117,800 A | 6/1992 | Watson et al. |

(Continued)

FOREIGN PATENT DOCUMENTS

| CA | 2241384 A1 | 1/2000 |
| CN | 101526035 A | 9/2009 |

(Continued)

OTHER PUBLICATIONS

Merkisz, J., Fuć, P., Lijewski, P., Wojciechowski, K. et al., "Possibilities of NOx Reduction in the Emissions of Compression Ignition Engines through Ceramic Oxygen Conductors and Thermoelectric Materials," SAE Technical Paper 2007-01-3449, 2007.

(Continued)

*Primary Examiner* — Marguerite J McMahon
(74) *Attorney, Agent, or Firm* — Bejin Bieneman PLC

(57) ABSTRACT

An oxygen separation device includes a substrate and an oxygen ion transport membrane supported on the substrate. The substrate has an air inlet end and a retentate outlet end. An intake air passageway extends through the substrate from the air inlet end to the retentate outlet end. The oxygen ion transport membrane is between the substrate and the intake air passageway and is adapted to separate oxygen atoms from the air in the intake air passageway and to transport the oxygen atoms to the substrate. The oxygen separation device collects the oxygen from the substrate for supply to an internal combustion engine for use as the gas of the gas-fuel mixture.

19 Claims, 8 Drawing Sheets

(51) Int. Cl.
*F17C 11/00* (2006.01)
*F02M 31/14* (2006.01)

(56) References Cited

U.S. PATENT DOCUMENTS

| | | | |
|---|---|---|---|
| 5,593,480 A | 1/1997 | Poeschl | |
| 5,636,619 A * | 6/1997 | Poola | B01D 53/22 123/585 |
| 5,649,517 A | 7/1997 | Poola et al. | |
| 5,678,526 A | 10/1997 | Cullen et al. | |
| 5,960,777 A * | 10/1999 | Nemser | B01D 53/228 123/26 |
| 6,126,833 A | 10/2000 | Stobbe et al. | |
| 6,152,121 A | 11/2000 | Tolman et al. | |
| 7,337,770 B2 | 3/2008 | Moon | |
| 7,377,272 B2 | 5/2008 | Davidson | |
| 8,070,922 B2 | 12/2011 | Nelson et al. | |
| 9,186,622 B1 | 11/2015 | Ranjan et al. | |
| 9,541,042 B2 * | 1/2017 | Song | F02M 27/04 |
| 2005/0199231 A1 * | 9/2005 | Heider | F02M 25/12 123/585 |
| 2007/0101975 A1 * | 5/2007 | Moon | F02D 19/12 123/585 |
| 2007/0157803 A1 | 7/2007 | McNeil et al. | |
| 2009/0139497 A1 * | 6/2009 | Shi | B01D 53/323 123/539 |
| 2009/0206297 A1 | 8/2009 | Karppinen et al. | |
| 2010/0300063 A1 * | 12/2010 | Palmer | F23D 1/00 60/39.461 |
| 2013/0247886 A1 * | 9/2013 | Hamad | B01D 53/22 123/704 |
| 2017/0074213 A1 | 3/2017 | Hamad et al. | |

FOREIGN PATENT DOCUMENTS

| | | |
|---|---|---|
| CN | 105781807 A | 7/2016 |
| CN | 106286022 A | 1/2017 |
| EP | 1172135 B1 | 10/2006 |
| JP | 2016211433 A | 12/2016 |
| WO | 0031386 A1 | 6/2000 |

OTHER PUBLICATIONS

Hunt, Anton, "Experimental investigations of oxygen-separating ion transport membranes for clean fuel synthesis," May 19, 2015.

Walls, Mark, "Feasible Techniques for Selected Gas Removal/Reduction in Gas Streams," SwRI and HEDGE-III, Feb. 2016.

Rakopoulos, C. et al., "Operation and Environmental Evaluation of Diesel Engines Burning Oxygen-Enriched Intake Air or Oxygen-Enriched Fuels : A Review," SAE 2004-01-2924, Oct. 2004.

Hountalas, D. et al., "Phenomenological Modelling of Oxygen-Enriched Combustion and Pollutant Formation in Heavy-Duty Diesel Engines using Exhaust Gas Recirculation," SAE 2012-01-1725, Sep. 2012.

Masimalai, S. et al., "Assessment of Performance, Emission and Combustion Behaviour of a WCO Based Diesel Engine Using Oxygen Enrichment Technique," SAE 2015-01-0895, Apr. 2015.

Eltron Research & Development Tech Brief : Oxygen Separation Membranes, 2009.

* cited by examiner

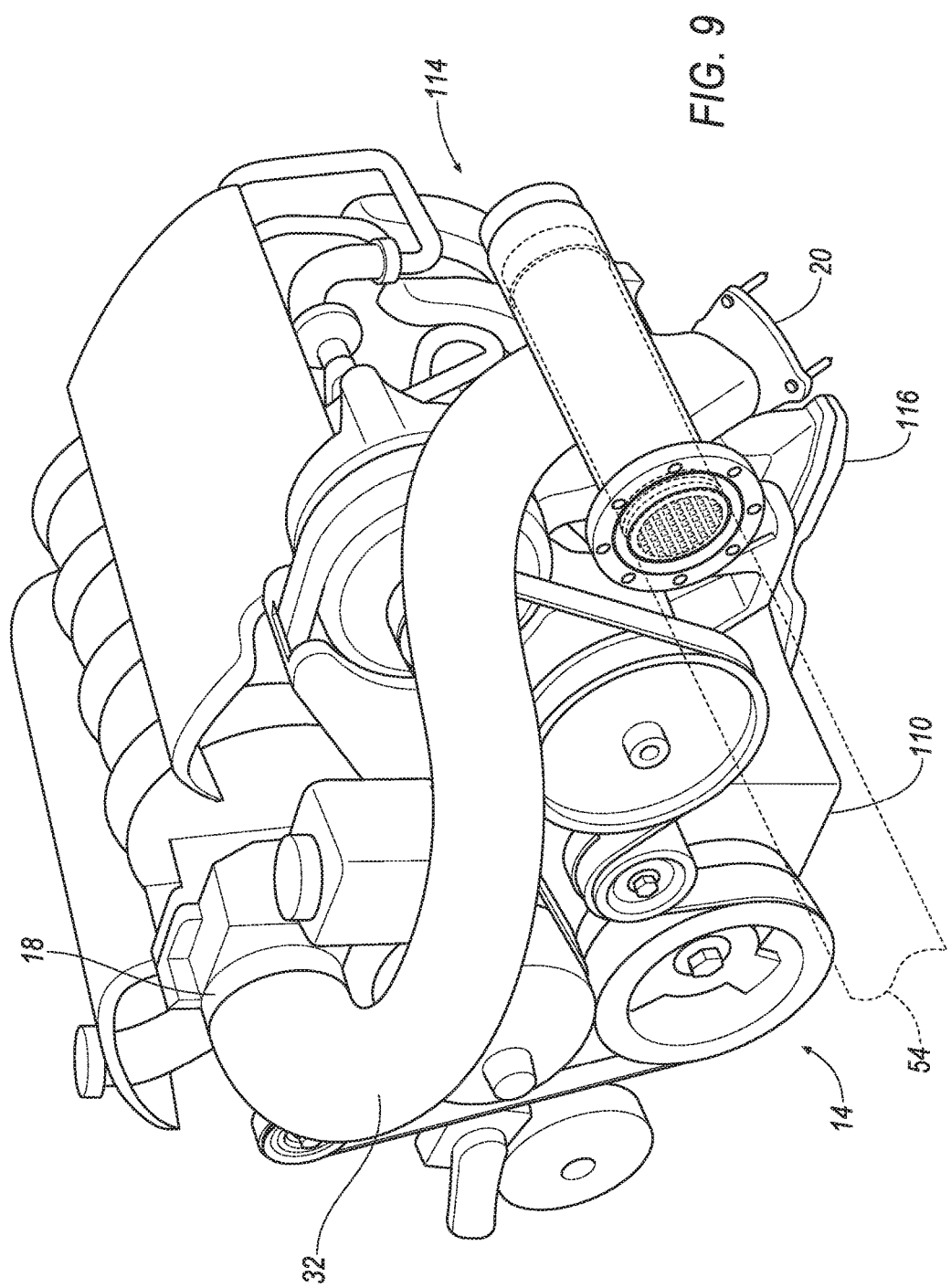

SYSTEM INCLUDING OXYGEN SEPARATION DEVICE

BACKGROUND

Internal combustion engines that operate on air as the gas of the gas-fuel mixture emit combustion by-products including $NO_x$, CO, hydrocarbons, particles, etc. Accordingly, internal combustion engines, e.g., such as those used to power vehicles, include emissions after-treatment equipment to eliminate or reduce such by-products.

The enrichment of air with oxygen for the gas of the gas-fuel mixture can virtually eliminate soot emissions and can significantly reduce CO and hydrocarbon emissions. The type of enrichment of air with oxygen can increase $NO_x$ emissions. However, the use of substantially pure oxygen as the gas of the gas-fuel mixture can achieve a near-zero emissions of $NO_x$.

BRIEF DESCRIPTION OF THE DRAWINGS

FIG. 9 is a perspective view of the internal combustion engine and the oxygen separation device.

DETAILED DESCRIPTION

Figure 1:
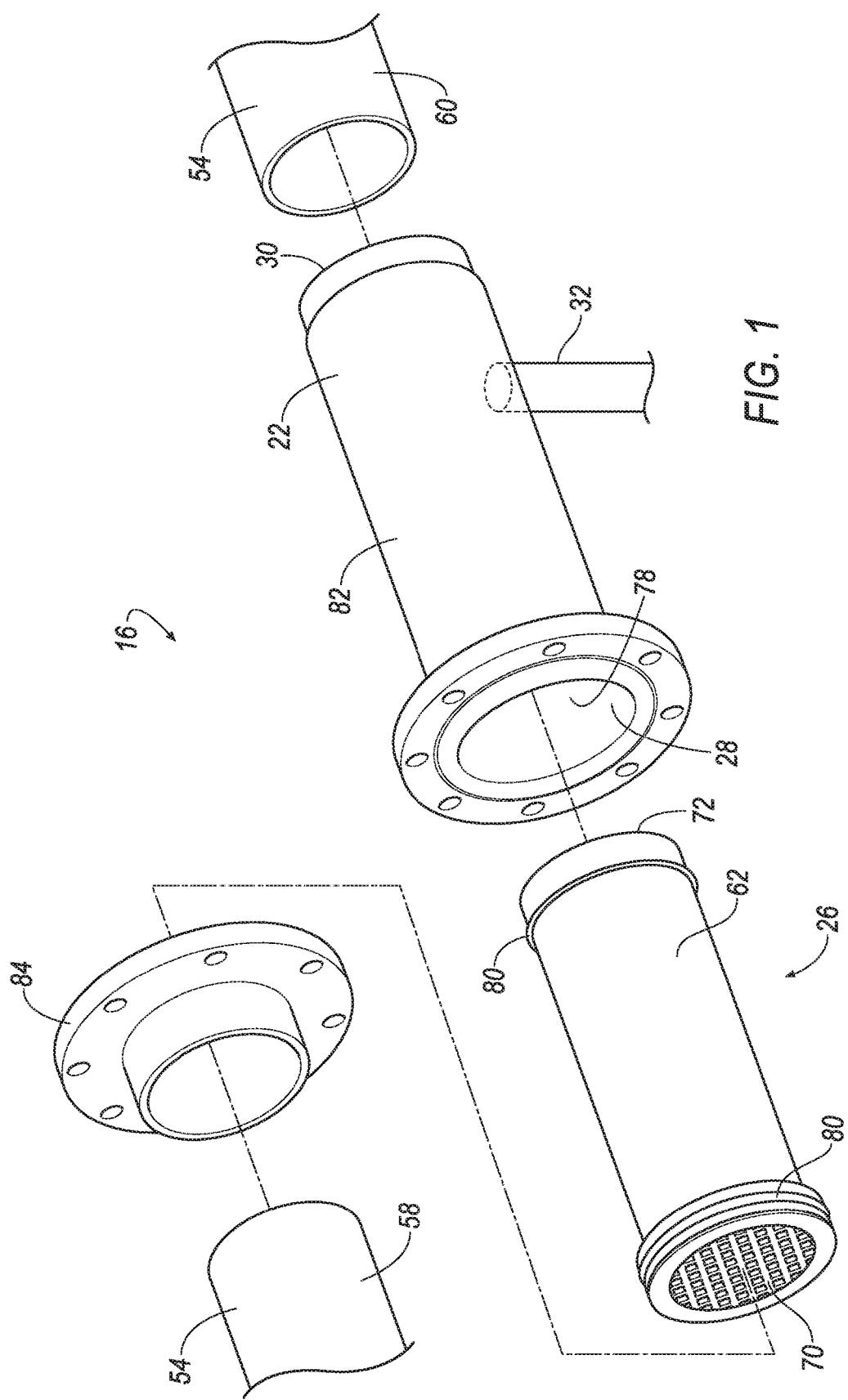
FIG. 1 is an exploded view of an oxygen separation device and an intake conduit.

With reference to the Figures, wherein like numerals indicate like parts throughout the several views, one example of a system 10 for a vehicle includes an internal combustion engine 14 and an oxygen separation device 16. The internal combustion engine 14 includes a combustion gas inlet 18. The oxygen separation device 16 is positioned to be heated with heat generated by the internal combustion engine 14 during operation of the internal combustion engine 14. The oxygen separation device 16 includes a casing 24 and a module 26 in the casing 24. The casing 24 has an air inlet 28, a retentate outlet 30, and a permeate outlet 32. The permeate outlet 32 is in fluid communication with the combustion gas inlet 18 of the internal combustion engine 14. The module 26 includes an oxygen ion transport membrane 34 separating the retentate outlet 30 and the permeate outlet 32.

In such an example, heat from the internal combustion engine 14 warms the module 26 to an operating temperature, i.e., a temperature ideal for oxygen separation from air that enters the air inlet 28 of the casing 24. Specifically, operation of the internal combustion engine 14 creates heat, e.g., in the form of hot exhaust gas exhausted from the internal combustion engine 14 at the exhaust gas outlet 20 and in the form of heat on external components of the internal combustion engine 14. Since the oxygen separation device 14 is positioned to be heated with heat generated by the internal combustion engine 14, the casing 24 and the module 26 in the casing 24 are heated by the internal combustion engine 14. As described further below, the operating temperature of the oxygen ion transport membrane 34 is greater than ambient air. Accordingly, the heat from the internal combustion engine 14 14 heats the oxygen ion transport membrane 34 to the operating temperature.

Another example of the system 10 also includes the internal combustion engine 14 and the oxygen separation device 16. The internal combustion engine 14 includes the combustion gas inlet 18; and the oxygen separation device 16 includes the air inlet 28, the retentate outlet 30, the permeate outlet 32, and the oxygen ion transport membrane 34 separating the retentate outlet 30 and the permeate outlet 32. The permeate outlet 32 is connectable with the combustion gas inlet 18 of the internal combustion engine 14, and an oxygen storage tank 38 is connectable with the combustion gas inlet 18 of the internal combustion engine 14. At least one valve 40, 42, 44 is moveable between a first position in which at least one valve 40, 42, 44 connects the oxygen storage tank 38 and the combustion gas inlet 18 of the internal combustion engine 14, and a second position in which at least one valve 40, 42, 44 connects the permeate outlet 32 of the oxygen separation device 16 and the combustion gas inlet 18 of the internal combustion engine 14.

In such an example, at least one valve 40, 42, 44 may be moved to the first position to feed oxygen from the oxygen storage tank 38 to the internal combustion engine 14 when the oxygen separation device 16 does not produce oxygen and/or does not produce oxygen at sufficient quantity to feed the internal combustion engine 14. For example, at least one valve 40, 42, 44 may be moved to the first position to feed oxygen from the storage tank to the internal combustion engine 14 when the oxygen ion transport membrane 34 is below an operating temperature, e.g., during initial start-up of the internal combustion engine 14. When the oxygen separation device 16 produces a quantity of oxygen sufficient to supply to the internal combustion engine 14, i.e., when the oxygen ion transport membrane 34 is at an operating temperature, at least one valve 40, 42, 44 may be moved to the second position to supply oxygen from the oxygen separation device 16 to the internal combustion engine 14.

In another example, the oxygen separation device 16 includes a substrate 46, which defines an air inlet 28 and a retentate outlet 30. An intake air passageway 48 extends through the substrate 46 from the air inlet 28 to the retentate outlet 30. The oxygen ion transport membrane 34 is supported on the substrate 46 between the substrate 46 and the intake air passageway 48. The oxygen ion transport membrane 34 is adapted to separate oxygen atoms from the air in the intake air passageway 48 and to transport the oxygen atoms to the substrate 46. The oxygen ion transport membrane 34 has a surface area per unit volume of at least 1 $cm^2/cm^3$.

The surface area per unit volume of at least 1 $cm^2/cm^3$ reduces the size of the oxygen separation device 16, and specifically, reduces the size of the module 26 necessary to effectively produce enough oxygen for the gas-fuel mixture for the internal combustion engine 14. This reduction in size reduces the amount of energy necessary to heat the module 26 to the operating temperature, which reduces energy consumption and/or reduces warm-up time. In addition, this reduction in size reduces material cost and is beneficial to packaging constraints within the vehicle.

The internal combustion engine 14 is designed to operate on a gas-fuel mixture in which the gas is substantially pure oxygen ($O_2$ gas, hereinafter referred to as "oxygen"). Examples of "substantially pure oxygen" includes pure oxygen, as well as oxygen in combination with trace contaminates due to minor inefficiencies in the oxygen transport process and/or minor leaks. The use of substantially pure oxygen as the gas of the gas-fuel mixture significantly reduces soot emissions, and significantly reduces both carbon monoxide, hydrocarbon, and $NO_x$ emissions. The fuel of the gas-fuel mixture may be, for example, any suitable hydrocarbon. The fuel, for example, may be gasoline, diesel fuel, alcohol, methanol, ethanol, butanol, dimethylether, biodiesel, renewable diesel, kerosene, jet fuel, bunker fuel, etc.

The vehicle in which the internal combustion engine 14 may be used may be, for example, a ground vehicle, such as a passenger automobile, truck, bus, etc.; a water vehicle, such as a boat, ship, etc., and/or an air vehicle, such as a plane, helicopter, etc. As another example, the internal combustion engine 14 may be used in a stationary application or any other suitable application. The system shown in the figures includes a single oxygen separation device 16, but may include any suitable number of oxygen separation devices 16, i.e., one or more, each connected to the same internal combustion engine 14.

Figure 8:
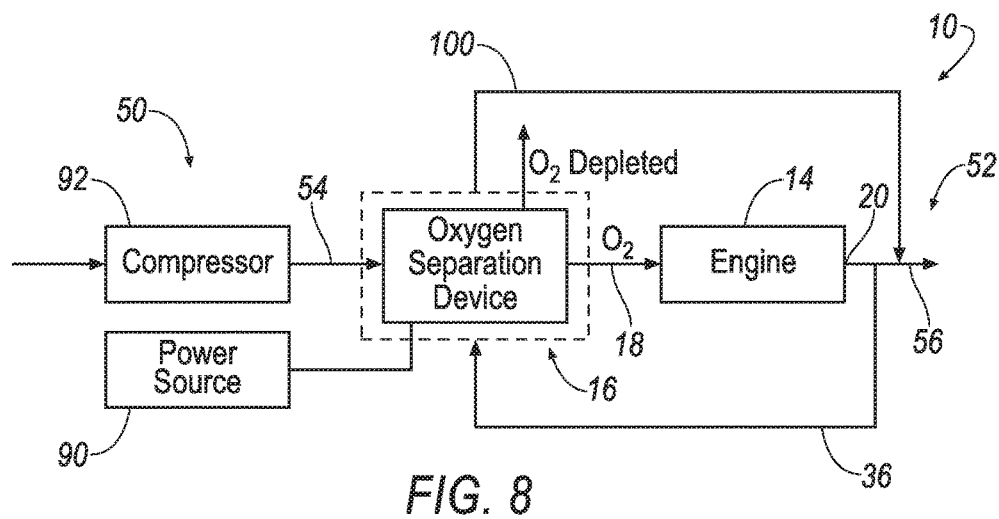
FIG. 8 is a block diagram of a system including the oxygen separation device and an exhaust conduit delivering exhaust gas from the internal combustion engine to the oxygen separation device.

The internal combustion engine 14 includes the combustion gas inlet 18 and an exhaust gas outlet 20. The combustion gas inlet 18 receives the oxygen from the oxygen separation device 16 for the gas-fuel mixture, as described above. The internal combustion engine 14 generates heat during operation, i.e., resulting from the combustion of the gas-fuel mixture. With reference to FIG. 8, the internal combustion engine 14 includes an engine block 110 and other accessories, such as, for example, exhaust headers 114, an oil pan 116, etc.

The system 10 includes an intake system 50 for feeding the gas-fuel mixture to the internal combustion engine 14, and an exhaust system 52 for exhausting exhaust gases from the internal combustion engine 14. The intake system 50 draws in intake air from the atmosphere, and mixes the fuel with the intake air to form a combustion gas. The intake system 50 includes an intake conduit 54 in fluid communication with the oxygen separation device 16 for feeding intake air to the oxygen separation device 16.

The exhaust system 52 includes an exhaust pipe 56. The exhaust system 52, including the exhaust pipe 56, may have any suitable number of manifolds, pipes, paths, circuits, etc.

Figure 2:
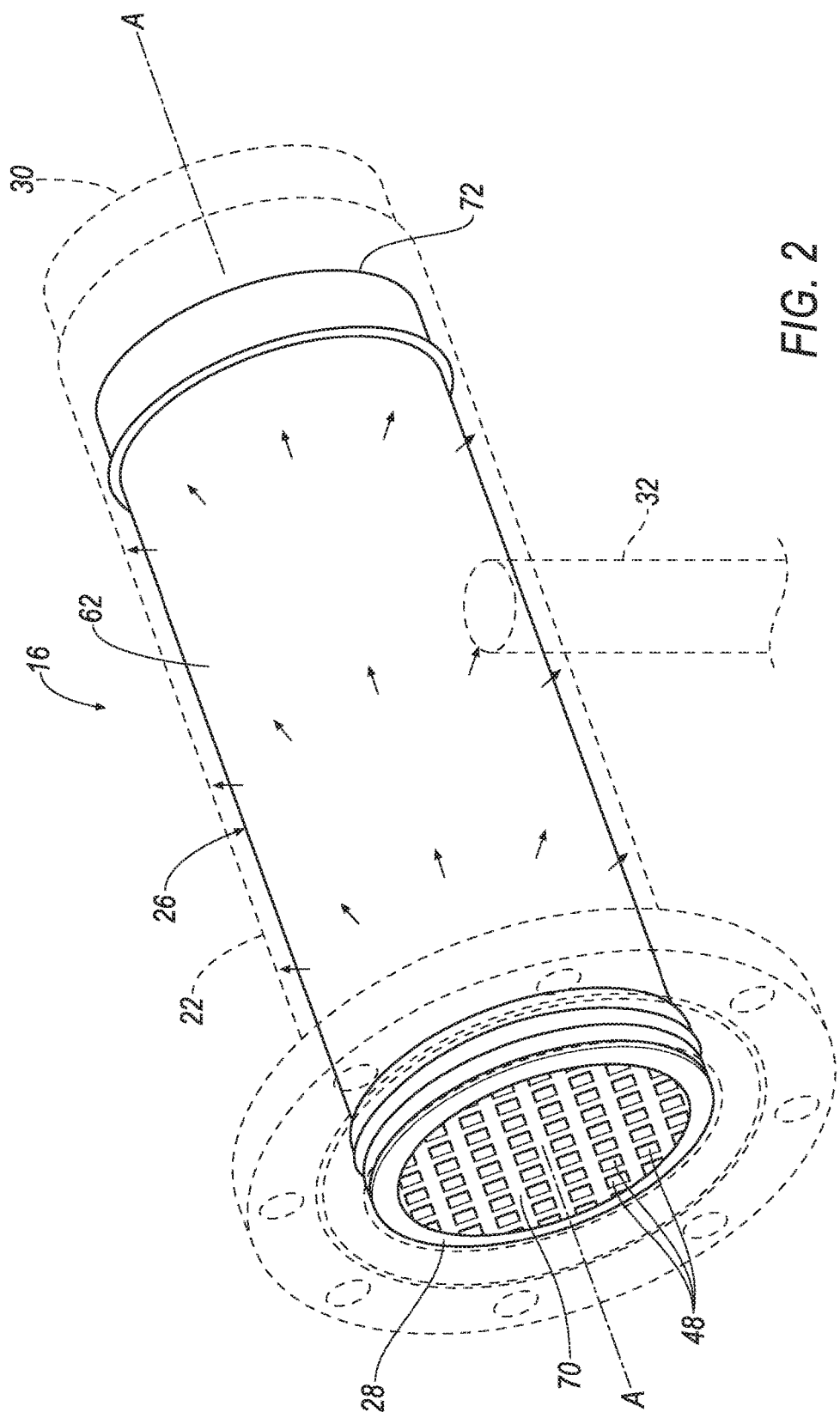
FIG. 2 is a perspective view of the oxygen separation device with a housing shown in broken lines to show a module.

With reference to FIGS. 1 and 2, the oxygen separation device 16 is in-line with the intake conduit 54 of the intake system 50. Specifically, the intake conduit 54 includes an upstream conduit 58 and a downstream conduit 60. The air inlet 28 of the oxygen separation device 16 is connected to the upstream conduit 58, and the permeate outlet 32 of the oxygen separation device 16 is connected to the downstream conduit 60. The air inlet 28 is in fluid communication with the upstream conduit 58 and the intake air passageways 48, and the permeate outlet 32 is in fluid communication with the downstream conduit 60. The intake air flows through the upstream conduit 58 to the oxygen separation device 16. The intake air flows through the intake air passageways 48, and the oxygen separation device 16 separates substantially pure oxygen from the intake air, as described further below. As also described further below, this substantially pure oxygen is used as the gas of the gas-fuel mixture for the internal combustion engine 14, and the remainder of the intake air is exhausted from the retentate outlet 30 of oxygen separation device 16 to atmosphere and/or for storage or immediate use for other operations of the vehicle. As an example, the intake air exiting the retentate outlet 30 may be pressurized, as described below, and this pressurized gas may be used in other vehicle operations that operate on pressurized gas.

As set forth above, the oxygen separation device 16 includes the module 26, which includes the substrate 46 and the oxygen ion transport membrane 34. The oxygen ion transport membrane 34 is coated on at least a portion of the substrate 46. As described forth further below, the oxygen separation device 16 includes the casing 24, which supports the module 26 and which collects oxygen from the module 26. The casing 24 may define the air inlet 28, the retentate outlet 30, and the permeate outlet 32.

The module 26 may have an axis A extending through the air inlet 28 and the retentate outlet 30 of the oxygen separation device 16. The module 26 has at least one intake air passageway 48 passing through the substrate 46. For example, as shown in the figures, the module 26 may include a plurality of intake air passageways 48. In such an example, each of the intake air passageways 48 may extend along the axis A, e.g., may be parallel to the axis A. Each of the plurality of intake air passageways 48 are separated from each other by the substrate 46.

With reference to FIGS. 1-3 and 5, the substrate 46 may be elongated along the axis A. The substrate 46 may include an outer wall 62 surrounding the intake air passageways 48. The outer wall 62 may be elongated along the axis A. The outer wall 62 has an inner surface 64 and an outer surface 66 concentric with the inner surface 64. The oxygen ion transport membrane 34 covers the inner surface 64, and the outer surface 66 is free of the oxygen ion transport membrane 34, i.e., the oxygen ion transport membrane 34 does not extend across the outer surface 66. The outer wall 62 may be elongated along the axis A. The outer wall 62 may be cylindrical, as shown in the figures, or may be of any suitable shape.

The substrate 46 may include inner walls 68 surrounding the intake air passageways 48. Each inner wall 68 may be connected directly, or indirectly, to the outer wall 62 to transfer oxygen from each of the inner walls 68 to the outer surface 66 of the outer wall 62. Specifically, at least some of the inner walls 68 extend from, i.e., directly from, the inner surface 64 of the outer wall 62. The inner walls 68 may each have a wall thickness WT of between 0.1 and 1.0 mm. The wall thickness WT is identified in FIG. 3. It should be appreciated that the wall thickness WT of the inner walls 68 of the substrate 46, and a membrane thickness MT (described below) of the oxygen ion transport membrane 34 shown in FIGS. 3-7 are not drawn to scale relative to each other.

As another example, in addition, or in the alternative to transfer of oxygen from the inner walls 68 to the outer surface 66 of the outer wall 62, the module 26 may include oxygen collection passageways (not shown) elongated along the axis A and, for example, in parallel with the intake air passageways 48. In such an example, the oxygen collection passageways are separated from the intake air passageways 48 by the substrate 46. Oxygen transported through the oxygen ion transport membrane 34 from the intake air passageway 48 to the substrate 46 subsequently flows through the substrate 46 to the oxygen collection passageways. A collection tube, e.g., at the retentate outlet end 72 of the substrate 46, may be in fluid communication with the oxygen collection passageways, and fluidly isolated from the intake air passageways 48, to collect the oxygen and communicate the oxygen to the downstream conduit 60.

With reference to FIGS. 1 and 2, the substrate 46 includes an air inlet end 70 and retentate outlet end 72. The intake air passageways 48 extend through the substrate 46 from the air inlet end 70 to the retentate outlet end 72. The air inlet end 70 of the substrate 46 is in fluid communication with the air inlet 28 of the casing 24, and the retentate outlet end 72 of the substrate 46 is in fluid communication with the retentate outlet 30 of the casing 24. The air inlet end 70 is adjacent to the air inlet 28 of the oxygen separation device 16, and the retentate outlet end 72 is adjacent to the retentate outlet 30 of the oxygen separation device 16.

The material of the substrate 46 may be a ceramic. For example, the material of the substrate 46 may include a metal carbide. The metal carbide may be a mono-metal carbide or a multi-metal carbide. As one example, the substrate 46 may be silicon carbide. The material of the substrate 46 may be doped to achieve the desired thermal conductivity of the substrate 46.

The substrate 46 is porous, i.e., includes pores 74 (shown schematically in FIG. 4) sized to allow oxygen to flow therethrough. In the example, shown in the figures, the pores 74 extend between the oxygen ion transport membrane 34 and the outer wall 62, e.g., from the oxygen ion transport membrane 34 to the outer wall 62 or from an electrode (described below) to the outer wall 62. In another example including the oxygen collection passageways described above, the pores 74 extend between the oxygen ion transport membrane 34 and the oxygen collection passageways. The oxygen ion transport membrane 34 transports oxygen from the intake air to the substrate 46. In the substrate 46, the oxygen flows through the pores 74 to the outer wall 62, as shown in the figures, and/or to the oxygen collection passageways described above. Oxygen flow through the substrate 46 is identified, for example, with arrows along the substrate 46 in FIGS. 3 and 7. The pores 74 of the substrate 46 may be 0.5-50 µm.

The substrate 46 may be monolithic. In other words, substrate 46 may be one piece without seams or joints. As an example, the substrate 46 may formed as, and/or from, a single piece of material without seams or joints. As another example, the substrate 46 may be formed of several pieces, i.e., not monolithic, that are separately formed and subsequently bonded together in any suitable fashion, e.g., with ceramic cement, to form the substrate 46. In such an example, material used to bond, e.g., the ceramic cement, may include a porous interface that does not significantly inhibit flow of oxygen through the substrate 46, in particular, across the interface at the bond.

Figure 5:
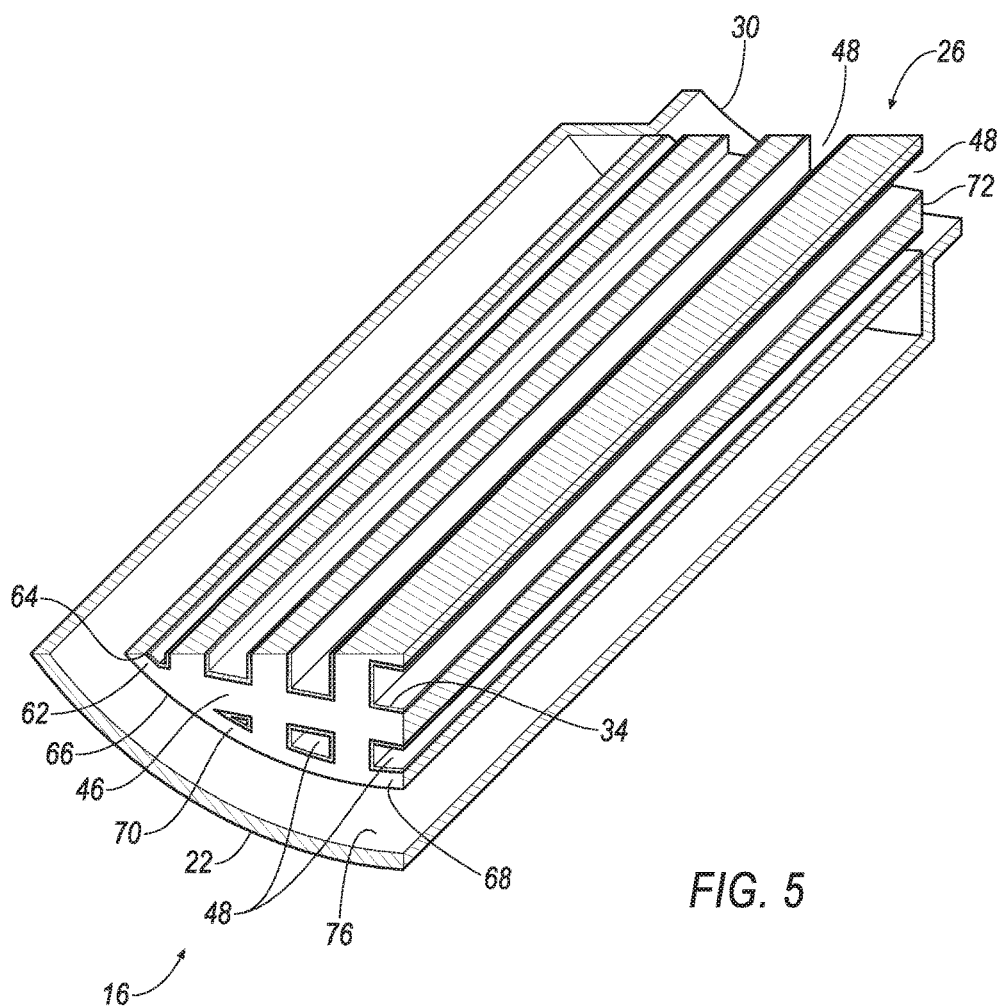
FIG. 5 is a cross-sectional view of the oxygen separation device.

With reference to FIG. 5, each of the intake air passageways 48 extend through the substrate 46. In other words, each of the intake air passageways 48 extend continuously from the air inlet end 70 to the retentate outlet end 72, i.e., each intake air passageway 48 has a path suitable for fluidly communicating the intake air from the air inlet end 70 to the retentate outlet end 72. Accordingly, intake air flows through the air inlet 28 of the oxygen separation device 16 into each intake air passageway 48 at the air inlet end 70 of the substrate 46, and flows through the intake air passageways 48 to the retentate outlet end 72 of the substrate 46 and the retentate outlet 30 of the oxygen separation device 16. The retentate outlet 30 of the oxygen separation device 16 may exhaust to atmosphere and/or to a retentate conduit for storage for other operations of the vehicle, as described below. The inner walls 68 and the outer wall 62 of the substrate 46 enclose the intake air passageways 48 from the air inlet end 70 to the retentate outlet end 72. This prevents the intake air from exiting the intake air passageways 48 at any location other than at the retentate outlet end 72. As described above and below, the intake air is depleted of oxygen at the retentate outlet end 72 because the oxygen separation device 16 separates oxygen from the intake air as the intake air flows from the air inlet end 70 to the retentate outlet end 72.

The intake air passageways 48 may each be straight, as shown in FIG. 5. For example, the intake air passageways 48 may be elongated along the axis A and may extend in parallel with the axis A. As another example, one or more of the intake air passageways 48 may include bends, curves, etc. In any event, the intake air passageways 48 each extend from the air inlet end 70 to the retentate outlet end 72.

Figure 3:
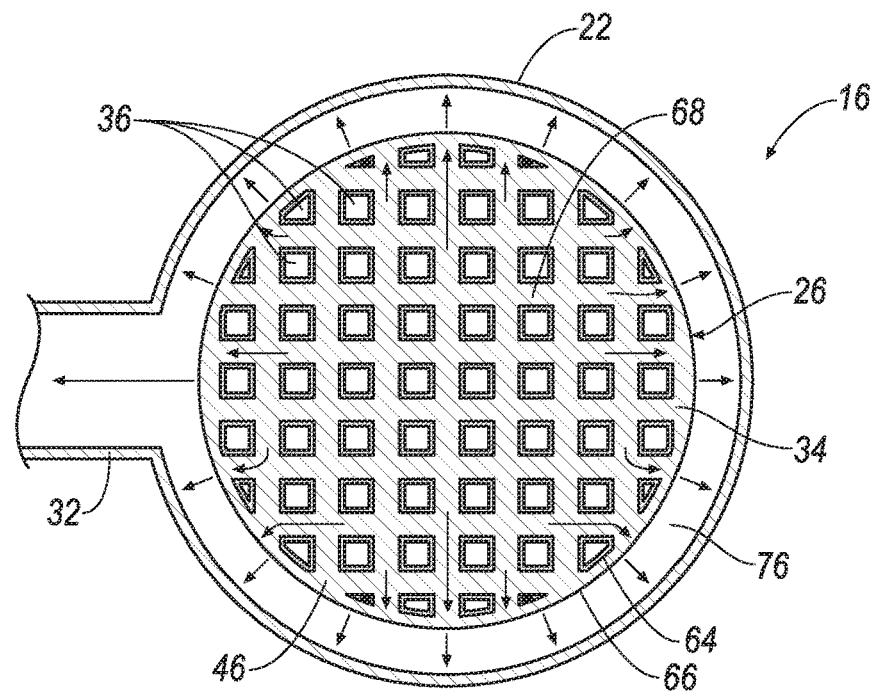
FIG. 3 is a cross-sectional view of the oxygen separation device.

With reference to FIGS. 1-3, the intake air passageways 48 may be arranged in a grid pattern. Specifically, the intake air passageways 48 may be arranged in a repeating pattern. The intake air passageways 48 may have a rectangular cross-section, e.g., a square cross-section as shown in FIGS. 1-3. In the example where the intake air passageways 48 are square, the height and width of each intake air passageway 48 may be, for example, 0.5-5.0 mm.

Alternatively, the intake air passageways 48 may be of any suitable shape. One or more of the intake air passageways 48 may have different shapes and/or sizes than others of the intake air passageways 48. For example, some of the intake air passageways 48, e.g., about 50%, may have a relatively smaller dimension, and the remaining intake air passageways 48 may have a relatively larger dimension. The intake air passageways 48 may be arranged in any suitable pattern. For example, the pattern may be based on manufacturing feasibility and/or performance of the oxygen separation device 16.

Figure 4:
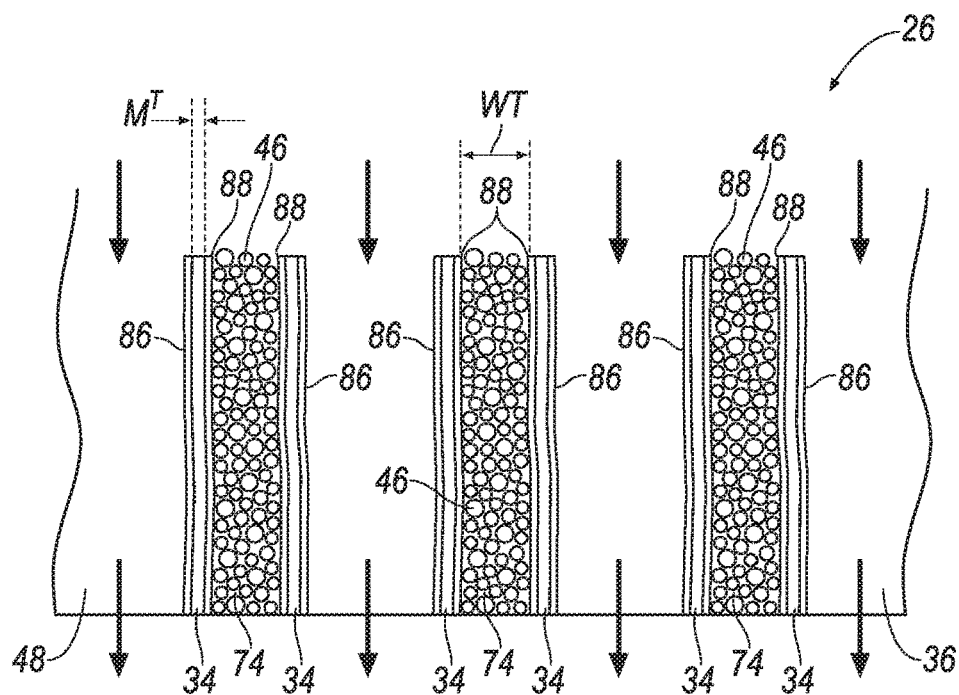
FIG. 4 is a schematic of the module.

With reference to FIGS. 3-5, the oxygen ion transport membrane 34 is between the substrate 46 and the intake air passageway 48. Specifically, the oxygen ion transport membrane 34 covers the inner walls 68 and the inner surface 64 of the outer wall 62 of the substrate 46. Specifically, the oxygen ion transport membrane 34 is layered on the surfaces of the inner walls 68 and the inner surface 64 of the outer wall 62. The oxygen ion transport membrane 34 covers each intake air passageways 48 from the air inlet end 70 to the retentate outlet end 72, and is in contact with the intake air as the intake air flows through the intake air passageways 48.

As set forth above, the oxygen ion transport membrane 34 is adapted to separate oxygen atoms. The oxygen ion transport membrane 34 dissociates dioxygen molecules ($O_2$ molecules) from the intake air into oxygen atoms (O atoms) by dissociative adsorption. The oxygen ion transport membrane 34 includes a crystal structure having vacancies where oxygen atoms would otherwise normally be, thus allowing oxygen atoms to diffuse through the crystal structure. On the other side of the oxygen ion transport membrane 34, e.g., adjacent the substrate 46, the oxygen atoms are reconstituted as dioxygen molecules by recombinative desorption. As described below, the transport of oxygen atoms across the oxygen ion transport membrane 34 may be voltage driven, i.e., electrochemical, or may not be voltage driven. When not voltage driven, the transport of oxygen atoms across the oxygen ion transport membrane 34 may be, for example, pressure driven.

As one example, the material of the oxygen ion transport membrane 34 may be a ceramic. For example the oxygen ion transport membrane 34 may be a ceramic perovskite. As set forth above, the substrate 46 may be ceramic and, in such example, substrate 46 may be a type of ceramic and the oxygen ion transport membrane 34 may be another type of ceramic, i.e., a different type of ceramic. As another example, the material of the oxygen ion transport membrane 34 may be a material other than ceramic, e.g., the material of the oxygen ion transport membrane 34 may include a non-porous polymeric material, e.g., polysufone, polyimide, cellulose acetate, and polycarbonate.

The oxygen ion transport membrane 34 may be only permeable to oxygen. As an example, oxygen ion transport membrane 34 may be most permeable to oxygen at operating temperatures above 700° F. In other words, the oxygen ion transport membrane 34 does not transport oxygen therethrough, or does so at a relatively lower rate, at temperatures below 700° F.

As set forth above, the oxygen ion transport membrane 34, may have a surface area per unit volume of at least 1 $cm^2/cm^3$. For example, the surface area per unit volume of the oxygen ion transport membrane 34 may be greater than 10 $cm^2/cm^3$. As an example, the surface area per unit volume of the oxygen ion transport membrane 34 may be between 10-50 $cm^2/cm^3$.

The oxygen ion transport membrane 34 may have a thickness MT of 0.1-10 μm. The thickness MT of the oxygen ion transport membrane 34 is identified in FIG. 4.

With reference to FIGS. 1-3 and 5, the casing 24 surrounds the outer wall 62. As shown in FIGS. 3 and 5, the casing 24 defines an oxygen collection space 76 between the casing 24 and the outer wall 62. The oxygen collected in the substrate 46 through the oxygen ion transport membrane 34 is collected in the oxygen collection space 76.

The casing 24 includes a bore 78 that receives the module 26. The bore 78 may match the shape of the module 26, or may have any other suitable shape. For example, as shown in FIGS. 1-3, the bore 78 may be cylindrical to receive a cylindrical module 26.

The casing 24 and/or the module 26 may include seals 80 to seal the outer surface 66 of the outer wall 62 of the substrate 46 to the bore 78. The seals 80 prevent intake air from entering the oxygen collection space 76 to avoid contamination of the collected oxygen, and the seals 80 retain the oxygen in the oxygen collection space 76, i.e., prevent oxygen from escaping the oxygen collection space 76. As set forth above, the oxygen collection space 76 may also be separated from the intake air passageways 48 by the substrate 46. Specifically, the inner walls 68 and the outer wall 62 of the module 26 prevent intake air from entering the oxygen collection space 76 because the intake air passageways 48 extend continuously from the air inlet end 70 to the retentate outlet end 72. Accordingly, no intake air reaches the oxygen collection space 76.

As shown in FIGS. 1 and 2, the oxygen separation device 16 may include two seals 80, one at the air inlet end 70 and one at the retentate outlet end 72. The seals 80 may be formed of any suitable material and may have any suitable size and shape to seal between the casing 24 and the module 26 to prevent intake air and collected oxygen from traveling therebetween. As one example, as shown in FIGS. 1 and 2, the seals 80 may be fixed to the module 26 such that the module 26 and the seals 80 are a unit. Alternatively, or in addition, seals 80 may be fixed to the casing 24, e.g., in the bore 78.

The casing 24 may include any suitable number of components. For example, as shown in FIGS. 1 and 2, the casing 24 may include a body 82 receiving the module 26, and a cap 84 engageable with the body 82 to retain the module 26 in the bore 78. The body 82 may include a flange to retain the module 26 in the body 82. The casing 24 may be of any suitable material, e.g., stainless steel, aluminum, plastic, etc.

The downstream conduit 60 is in fluid communication with the oxygen collection space 76, i.e., through the permeate outlet 32. Oxygen may be drawn from the oxygen collection space 76 through the downstream conduit 60 for delivery to the combustion gas inlet 18 of the internal combustion engine 14. The downstream conduit 60 may be of any suitable size, shape, and material.

Figure 6:
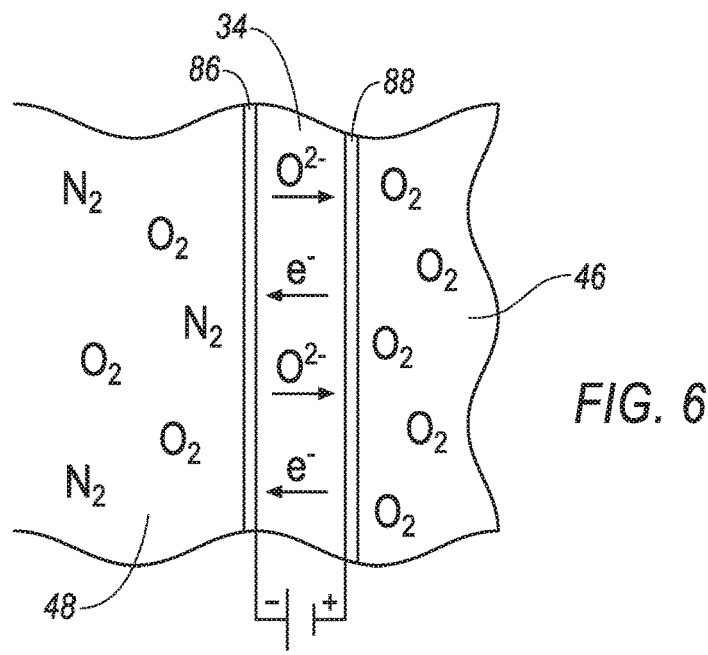
FIG. 6 a schematic view of an inner wall of the module.

The oxygen ion transport membrane 34 may be voltage driven, i.e., electrochemical, or may not be voltage driven. In examples where the oxygen ion membrane is voltage driven, the oxygen separation device 16 includes a first electrode 86 between the oxygen ion transport membrane 34 and the intake air passageway 48, and a second electrode 88 between the oxygen ion transport membrane 34 and the substrate 46, as shown in FIGS. 4 and 6. The first electrode 86 and the second electrode 88 are connected in circuit, and the system 10 may include a power source 90 (shown in FIGS. 8 and 10) to drive the circuit. The power source 90 is not shown in FIGS. 11-13, and the examples in FIGS. 11-13 may be voltage driven, including the power source 90, or may not be voltage driven.

With reference to FIG. 6, the first electrode 86 may be a cathode, and the second electrode 88 may be an anode. In such an example, the $O_2$ molecules are dissociated by dissociative adsorption at the first electrode 86 where four electrons interact with the $O2$ molecule to separate the $O_2$ molecule into two $O^{2-}$ anions. The $O^{2-}$ anions travel across the oxygen ion transport membrane 34 to the second electrode 88, where the electrons are liberated and the $O^{2-}$ anions are reconstituted as $O_2$ molecules by recombinative desorption, and the $O_2$ molecules are released into the pores 74 of the substrate 46.

As set forth above, the oxygen ion transport membrane 34 may not be voltage driven, e.g., the oxygen separation device 16 may not include the first electrode 86, the second electrode 88, or the power source. In such an example, the oxygen ion transport membrane 34 operates with the same dissociative adsorption and recombinative desorption described above. In the voltage drive examples above, the voltage may increase the rate of dissociative adsorption and recombinative desorption as compared to the non-voltage driven examples.

Figure 11:
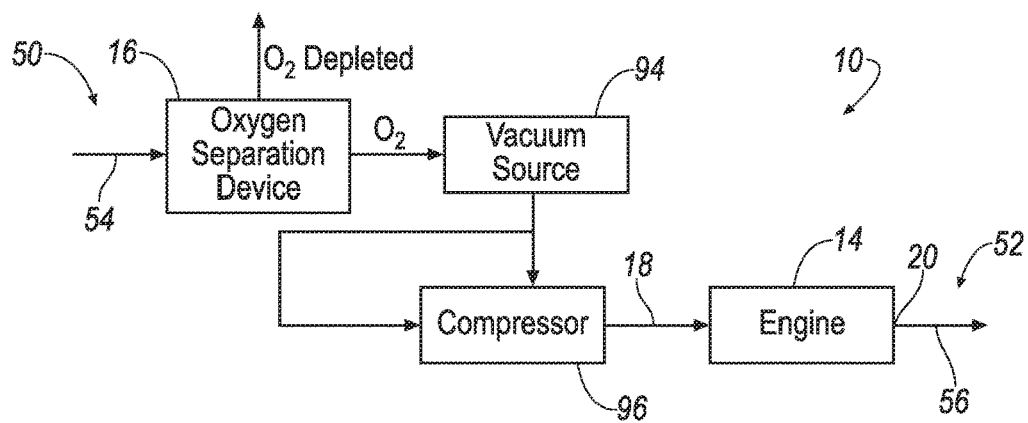
FIG. 11 is a block diagram of another example of the system including a vacuum source connected to a permeate outlet of the oxygen separation device.

In examples where the oxygen ion transport membrane 34 is not voltage driven, a positive pressure difference between the intake air passageways 48 and the oxygen collection space 76 may increase the dissociative adsorption and recombinative desorption. For example, the system 10 may include a compressor 92, as shown in FIGS. 8, 9, 11, and 12, in fluid communication with the intake air passageways 48 to pressurize the intake air in the intake air passageways 48 to increase the dissociative adsorption and recombinative desorption. As another example, as shown in FIG. 11, the system 10 may include a vacuum source 94, e.g., a vacuum pump, in fluid communication with the oxygen collection space 76 to draw a vacuum in the oxygen collection space 76 to increase the dissociative adsorption and recombinative desorption. In such an example, as shown in FIG. 11, the system 10 may include a compressor 96 to pressurize the oxygen (which is at a negative pressure due to the vacuum source) to feed to the internal combustion engine 14. The compressor 92 and/or the vacuum source 94 may also be used with the voltage driven example of the oxygen ion transport membrane 34 described above.

The oxygen separation device 16 may be heated to a temperature with heat generated by the internal combustion engine 14 during operation of the internal combustion engine 14. Specifically, the oxygen separation device 16 is positioned to be heated with heat generated by the internal combustion engine 14 during operation of the internal combustion engine 14. In other words, the oxygen separation device 16 is positioned so that heat transferred to the oxygen separation device 16 from the internal combustion engine 14 is sufficient to raise the temperature of the oxygen separation device 16 toward, or to, the operating temperature.

For example, the oxygen separation device 16 may be positioned to be heated with exhaust gas from the internal combustion engine 14, as described below. As another example, the oxygen separation device 16 may be positioned in direct contact with internal combustion engine 14 such that heat transfers from the internal combustion engine 14 to the oxygen separation device 16 at the point of contact. The heat from the internal combustion engine 14 may, entirely or in combination with other heating features, heat the oxygen separation device 16 to an operating temperature. In other words, when heated by the internal combustion engine 14, the oxygen separation device 16 is heated to the operating temperature solely with heat generated by the internal combustion engine 14, or is heated to the operating temperature partially with heat generated by the internal combustion engine 14 and partially with heat from another source.

Figure 7:
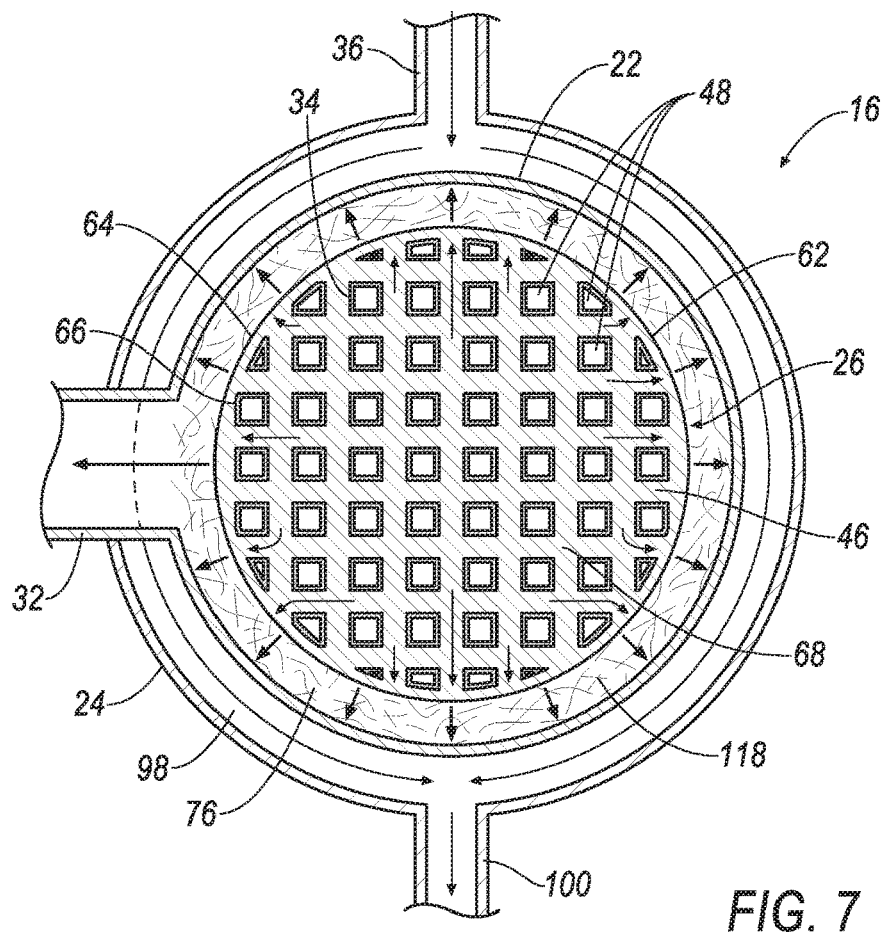
FIG. 7 is a cross-sectional view of an example of the oxygen separation device including a casing for heating the module with heat from exhaust gas from an internal combustion engine.

With reference to FIGS. 7 and 8, the oxygen separation device 16 may include a housing 22 for receiving exhaust gas to heat the module 26. The casing 24 is in the housing. The system 10 may include an exhaust gas conduit 36 in fluid communication with the exhaust gas outlet 20 of the internal combustion engine 14 and the housing 22 to warm the module 26 with heat from the exhaust gas. For example, as shown in FIG. 7, the housing 22 surrounds the casing 24 and is in fluid communication with the exhaust system 52 to move exhaust gas over the oxygen separation device 16. Specifically, the housing 22 defines a cavity 98 (shown in FIG. 7) in fluid communication with the exhaust system 52, e.g., with the exhaust gas outlet 20 directly or through intermediate components. The exhaust gas conduit 36 may extend from the exhaust pipe 56, directly or through intermediate components, to the cavity of the housing 22.

The cavity 98 is fluidly separated from the oxygen collection space 76 and the downstream conduit 60. Specifically, the casing 24 is in the cavity 98 with each of the air inlet 28, the retentate outlet 30, and the permeate outlet 32 of the casing 24 being fluidly separated from the cavity 98 of the housing 22. Accordingly, there is no mixture of the exhaust gas and the collection oxygen. The exhaust gas heats the housing 22, the casing 24, and the module 26 as the exhaust gas flows through the cavity 98.

As set forth above, the exhaust pipe 56 is in fluid communication with the exhaust gas outlet 20 of the internal combustion engine 14. The exhaust gas conduit 36 may extend from the exhaust pipe 56 to the exhaust path of the housing 22 to deliver the exhaust gas to the housing 22, and a return conduit 100 may extend from the exhaust path of the housing 22 to the exhaust pipe 56 to return exhaust gas from the housing 22 to the exhaust pipe 56. The exhaust gas conduit 36 and the return conduit 100 are a loop that directs the exhaust gas to the oxygen separation device 16 and returns the exhaust gas to the exhaust pipe 56.

Operation of the internal combustion engine 14 creates heat in the form of hot exhaust gas exhausted from the internal combustion engine 14 at the exhaust gas outlet 20. Since the exhaust gas conduit 36 is in fluid communication with the exhaust gas outlet 20 of the internal combustion engine 14 and the housing 22 of the oxygen separation device 16, the exhaust gas conduit 36 communicates the hot exhaust gas from the internal combustion engine 14 to the housing 22, which heats the housing 22, the casing 24 in the housing 22, and the module 26 in the casing 24.

As set forth above, the oxygen separation device 16 may contact the internal combustion engine 14 to transfer heat from the internal combustion engine 14 to the oxygen separation device 16. For example, with reference to FIG. 9, the oxygen separation device 16 may be in contact with the exhaust headers 114. As other examples, the oxygen separation device 16 may be in contact with the engine block 110, the oil pan 116, or any other component of the internal combustion engine 14 that transfers a suitable amount of heat to the oxygen separation device 16.

As shown in FIG. 7, the oxygen separation device 16 may include a heat absorber 118 in the oxygen collection space 76 of the casing 24. The heat absorber 118 may transfer heat from the casing 24 to the module 26. The heat absorber 118 is designed to allow the flow of oxygen from the module 26 through the oxygen collection space 76 to the permeate outlet 32. The heat absorber 118 may have a high porosity, high thermal conductivity, and be oxidation resistant. The heat absorber 118 may be, for example, fibrous and/or mesh. The heat absorber 118 may be, for example, stainless steel, nickel-chromium alloy, or any other suitable material for transferring heat and not impeding oxygen flow.

Figure 10:
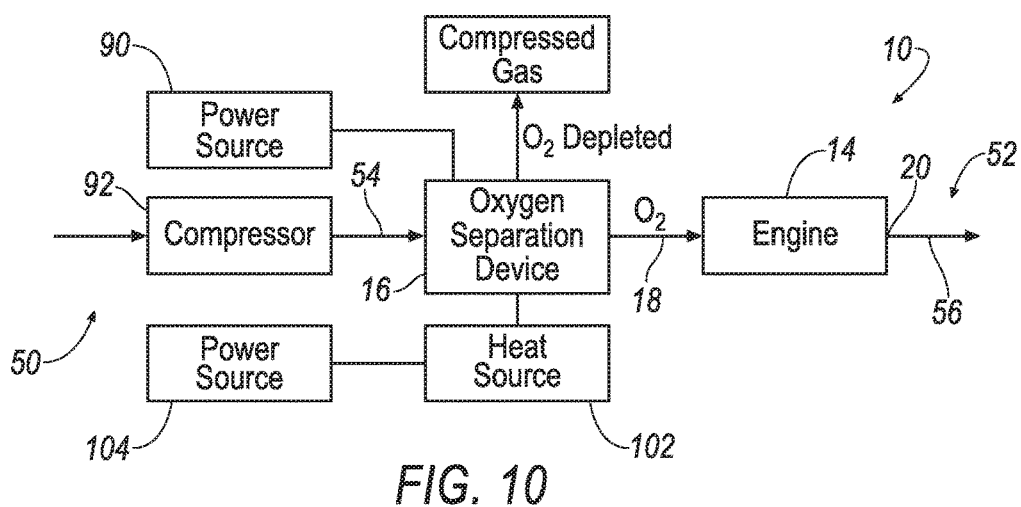
FIG. 10 is a block diagram of another example of the system including the oxygen separation device and an electric heater to heat the oxygen separation device.

With reference to FIG. 10, the system 10 may include an electrical heater 102 to heat the module 26. The electric heater 102 may be used in addition to, or in the alternative to, the exhaust gas heating described above. The electrical heater 102 is connected to a power source 104, e.g., a battery or auxiliary batter of the vehicle.

The electrical heater 102 may directly heat the casing 24 and/or the module 26. For example, the electrical heater 102 may include a heating pad on the casing 24 and/or the module 26, e.g., the substrate 46 and/or the oxygen ion separation membrane. The heating pad may conductively heat the casing 24 and/or the module 26. In such an example, the heating pad may be a resistive heater, i.e., heated by resistive heating.

As another example, in addition to, or in the alternative to directly heating the casing 24 and/or the module 26, the electrical heater 102 may heat the intake air upstream of the air inlet end 70. For example, the electrical heater 102 may include a heating filter upstream of the air inlet end 70. In such an example, the intake air flows through the heating filter, and the heating filter heats the intake air prior to entry of the intake air into the intake air passageways 48.

Figure 12:
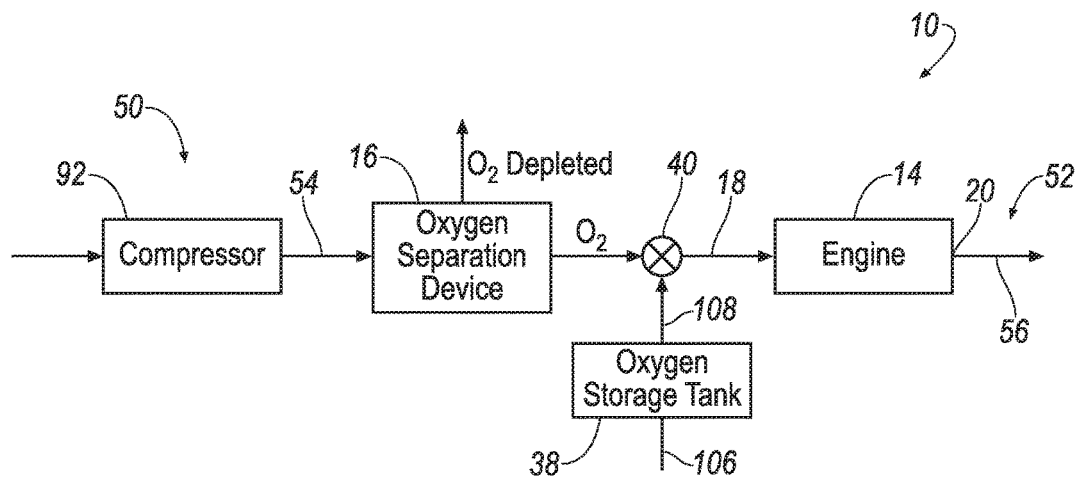
FIG. 12 is a block diagram of another example of the system including an oxygen storage tank having an external inlet for receiving oxygen from an external oxygen storage tank.

With reference to FIGS. 11 and 12, the system 10 may include an oxygen storage tank 38 in fluid communication with the combustion gas inlet 18 of the internal combustion engine 14. The fluid communication between the oxygen storage tank 38 and the combustion gas inlet 18 may be selectively connected and disconnected. For example, fluid communication may be connected between the oxygen storage tank 38 and the combustion gas inlet 18 when the oxygen separation device 16 is not producing a sufficient amount of oxygen for use by the internal combustion engine 14, e.g., when the module 26 is below a temperature ideal for oxygen separation, when the oxygen separation device 16 is operating inefficiently due to contamination, etc. In such an example, the fluid communication between the oxygen storage tank 38 and the combustion gas inlet 18 may be disconnected when the oxygen separation device 16 produces a sufficient amount of oxygen for use by the internal combustion engine 14.

The oxygen storage tank 38 may be a component of the vehicle. The oxygen storage tank 38 may be configured to store pressurized oxygen. Any suitable number and type of pipes and/or valves 40, 42, 44 may connect the oxygen storage tank 38 to the internal combustion engine 14 and/or the oxygen separation device 16. As described further below, the oxygen storage tank 38 may be supplied with oxygen by an external source and/or by the oxygen separation device 16.

With reference to FIG. 12, the oxygen storage tank 38 may include an external inlet 106 for receiving a supply of oxygen. For example, the oxygen storage tank 38 may receive a supply of oxygen from an external oxygen storage tank releasably coupled to the external inlet 106. In other words, the external inlet 106 is configured to be releasably connected to the external oxygen storage tank, e.g., the external inlet 106 may have a quick-release connection engageable with a quick-release connection on the external oxygen storage tank. The external oxygen storage tank is not a component of the vehicle. As an example, the external oxygen storage tank may be stationary, and the vehicle may be positioned adjacent the external oxygen storage tank to connect the oxygen storage tank 38 to the external oxygen storage tank.

With continued reference to FIG. 12, the system 10 may include at least one valve 40, 42, 44 between the oxygen storage tank 38 and the combustion gas inlet 18 of the internal combustion engine 14. The valve 40 shown in FIG. 12 is a single valve, however, the system 10 may include more than one valve 40 at various positions to selectively connect and disconnect fluid communication between the combustion gas inlet 18 and the oxygen storage tank 38 and permeate outlet 32.

The valve 40 is moveable between a first position in which the valve 40 connects fluid communication between the oxygen storage tank 38 and the combustion gas inlet 18 of the internal combustion engine 14, and a second position in which the valve 40 connects fluid communication between the permeate outlet 32 of the oxygen separation device 16 and the combustion gas inlet 18 of the internal combustion engine 14.

Specifically, the oxygen storage tank 38 includes an outlet 108 in fluid communication with the valve 40. In the first position, the valve 40 connects fluid communication between the oxygen storage tank 38 and the combustion gas inlet 18, i.e., the valve 40 is open between the oxygen storage tank 38 and the combustion gas inlet 18. When the valve 40 is in the first position, fluid communication between the oxygen separation device 16 and the combustion gas inlet 18 may be disconnected, e.g., by the valve 40 or another valve. When the valve 40 is in the second position, the valve 40 may provide fluid communication between the oxygen storage tank 38 and the combustion gas inlet 18.

In addition to, or in the alternative to receiving oxygen though the external inlet 106, the oxygen separation device 16 may be in fluid communication with the oxygen storage tank 38 to provide oxygen to the oxygen storage tank 38 for storage for later introduction to the combustion gas inlet 18. For example, with reference to FIG. 12, at least one valve 42, 44, e.g., valve 42 and valve 44, may selectively connect fluid communication between the permeate outlet 32 and the combustion gas inlet 18, between the oxygen storage tank 38 and the combustion gas inlet 18, and between the permeate outlet 32 and the oxygen storage tank 38. In other words, the oxygen separation device 16 may separate oxygen from the inlet air, as discussed above, and provide the oxygen to the oxygen storage tank 38 for later use. For example, in a situation where the oxygen separation device 16 produces oxygen in excess of the amount needed for operation of the internal combustion engine 14, the excess oxygen may be provided to, and stored in, the oxygen storage tank 38. The fluid communication between the oxygen storage tank 38 and the combustion gas inlet 18 may be selectively connected and disconnected from the combustion gas inlet 18 and the permeate outlet 32 of the oxygen separation device 16. Although two valves 42, 44 are shown in FIG. 13, it should be appreciated that, alternatively, one or more valves may be used to perform the same operations.

Figure 13:
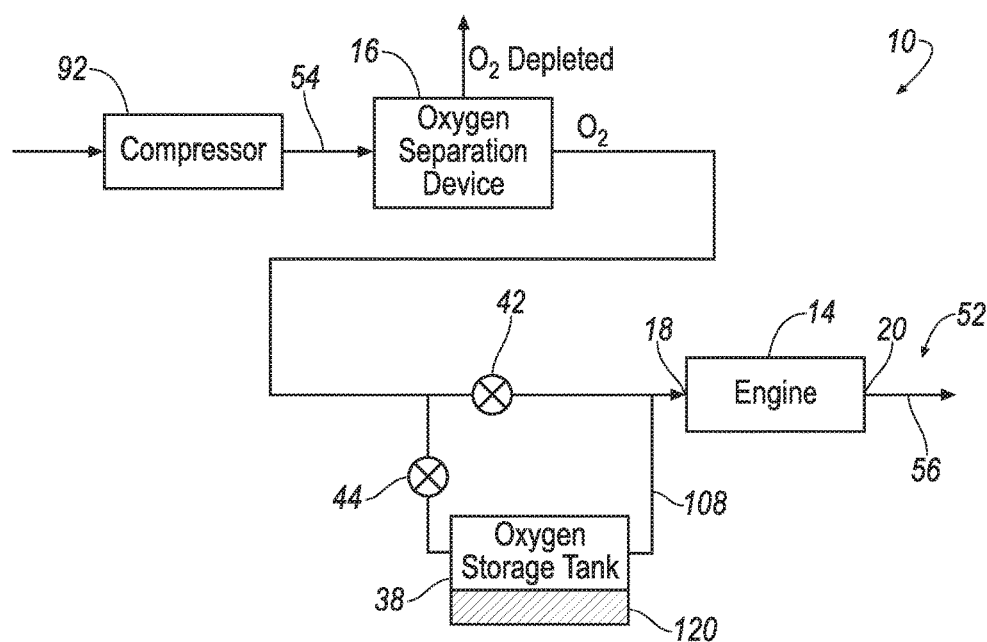
FIG. 13 is a block diagram of another example of the system including an oxygen storage tank connectable to the oxygen separation device and the internal combustion engine.

With continued reference to FIG. 13, the valves 42, 44 are moveable between a first position, a second position, and a third position. In the first position, the valves 42, 44 connect the oxygen storage tank 38 and the combustion gas inlet 18 of the internal combustion engine 14. When the valves 42, 44 are in the first position, the valves 42, 44 may disconnect the permeate outlet 32 of the oxygen separation device 16 and the combustion gas inlet 18 of the internal combustion engine 14. In such an example, the oxygen storage tank 38 may deliver all of the gas for the gas-fuel mixture.

In the second position, the valves 42, 44 connect the permeate outlet 32 of the oxygen separation device 16 and the combustion gas inlet 18 of the internal combustion engine 14. When the valves 42, 44 are in the second position, the valves 42, 44 may simultaneously connect fluid communication between the permeate outlet 32 and the oxygen storage tank 38, and between the permeate outlet 32 and the combustion gas inlet 18. In such an example, the oxygen separation device 16 delivers oxygen to both the combustion gas inlet 18 (for use as the gas of the gas-fuel mixture) and the oxygen storage tank 38 (for storage in the oxygen storage tank 38). As shown in FIG. 13, the system 10 may include a compressor between the oxygen separation device 16 and the oxygen storage tank 38 to pressurize the oxygen into the oxygen storage tank 38. The compressor shown in FIG. 11 may also be used to pressurize the oxygen into the oxygen storage tank 38 in addition to, or in the alternative to the compressor in FIG. 13.

In the third position, the valves 42, 44 connect the permeate outlet 32 of the oxygen separation device 16 and the combustion gas inlet 18 of the internal combustion engine 14. In the third position, the valves 42, 44 may disconnect the permeate outlet 32 of the oxygen separation device 16 from the oxygen storage tank 38. In such an example, the oxygen separation device 16 may deliver all of the gas for the gas-fuel mixture. The valves 42, 44 may be moved from the second position to the third position after the oxygen storage tank 38 is filled to capacity with oxygen.

The valves 40, 42, 44 may be of any suitable type, and may be moveable between the open and closed positions based on sensors that sense, for example, oxygen levels at the permeate outlet 32 of the oxygen separation device 16, temperature of the oxygen separation device 16, etc. For example, when the temperature of the oxygen separation device 16 is below a threshold, the oxygen separation device 16 may be disconnected from the combustion gas inlet 18 and the valves 40, 42, 44 may be opened to feed oxygen from the oxygen storage tank 38 to the combustion gas inlet 18; and when the temperature of the oxygen separation device 16 is above a threshold (e.g., above a minimum temperature at which the module 26 supplies oxygen), the oxygen separation device 16 may be connected to the combustion gas inlet 18 and the valve 40, 42, 44 may be closed to disconnect fluid communication between the oxygen storage tank 38 and the combustion gas inlet 18.

The system 10 may include oxygen adsorbing material 120 in the oxygen storage tank 38. The oxygen adsorbing material 120 increases the oxygen storage capacity of the oxygen storage tank 38 by reversibly storing oxygen. The oxygen adsorbing material 120 may be a microporous material such as a zeolite or metal organic framework material. The oxygen adsorbing material 120 may be operable to release oxygen as a result of pressure decrease in the oxygen storage tank 38 and/or by heating. In other words, the oxygen adsorbing material 120 may be operable to adsorb oxygen as a result of pressure increase and/or heat decrease in the oxygen storage tank 38, and may be operable to desorb oxygen as a result of pressure decrease and/or heat increase in the oxygen storage tank 38. The oxygen adsorbing material 120 may be used in addition to, or in the alternative to the pressurizing the oxygen into the oxygen storage tank 38 to increase the oxygen storage capacity.

The oxygen separation device 16 eliminate soot emissions, and may significantly reduce both carbon monoxide, hydrocarbon, and $NO_x$ emissions. Accordingly, the number and/or size of emission control equipment may be reduced. In order to control emissions from the internal combustion engine 14, the vehicle may include emission control equipment downstream of the internal combustion engine 14 to treat the exhaust gas. For example, if necessary, the vehicle may include a two-way catalytic converter, a three-way-catalytic converter, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
an internal combustion engine including a combustion gas inlet;
an oxygen separation device positioned to be heated with heat generated by the internal combustion engine during operation of the internal combustion engine;
the oxygen separation device including a casing and a module in the casing;
the casing having an air inlet, a retentate outlet, and a permeate outlet, the permeate outlet being in fluid communication with the combustion gas inlet of the internal combustion engine;
the module including an oxygen ion transport membrane separating the retentate outlet and the permeate outlet; and
a heat absorber between the casing and the module.

2. The system as set forth in claim 1, wherein the oxygen separation device includes a housing and the casing is disposed in the housing, wherein the internal combustion engine includes an exhaust gas outlet, and the system further comprises an exhaust gas conduit in fluid communication with the exhaust gas outlet and the housing.

3. The system as set forth in claim 2, wherein the housing defines a cavity in fluid communication with the exhaust gas conduit, and the casing is in the cavity with each of the air inlet, the retentate outlet, and the permeate outlet of the casing being fluidly separated from the cavity of the housing.

4. The system as set forth in claim 2, further comprising an exhaust pipe in fluid communication with the exhaust gas outlet of the internal combustion engine, and a return conduit extending from the housing to the exhaust pipe.

5. The system as set forth in claim 1, wherein the module includes a substrate and at least one intake air passageway passing through the substrate, the intake air passageway being in fluid communication with the air inlet and the retentate outlet of the casing, the oxygen ion transport membrane being between the substrate and the intake air passageway.

6. The system as set forth in claim 1, wherein the oxygen separation device contacts the internal combustion engine.

7. A system comprising:
an internal combustion engine including a combustion gas inlet;
an oxygen separation device including an air inlet, a retentate outlet, a permeate outlet, and an oxygen ion transport membrane separating the retentate outlet and the permeate outlet, the permeate outlet being connectable with the combustion gas inlet of the internal combustion engine;
an oxygen storage tank connectable with the combustion gas inlet of the internal combustion engine; and
at least one valve moveable between a first position in which the at least one valve connects the oxygen storage tank and the combustion gas inlet of the internal combustion engine, and a second position in which the at least one valve connects the permeate outlet of the oxygen separation device and the combustion gas inlet of the internal combustion engine.

8. The system as set forth in claim 7, wherein the at least one valve simultaneously connects the permeate outlet of the oxygen separation device to the oxygen storage tank and the combustion gas inlet when the at least one valve is in the second position.

9. The system as set forth in claim 8, wherein the at least one valve is moveable to a third position, wherein in the third position the at least one valve connects the permeate outlet of the oxygen separation device and the combustion gas inlet of the internal combustion engine, and wherein in the third position the at least one valve disconnects the permeate outlet of the oxygen separation device from the oxygen storage tank.

10. The system as set forth in claim 9, further comprising an oxygen adsorbing material in the oxygen storage tank.

11. The system as set forth in claim 7, wherein the at least one valve disconnects the permeate outlet of the oxygen separation device and the combustion gas inlet of the internal combustion engine when the at least one valve is in the first position.

12. The system as set forth in claim 7, wherein the at least one valve disconnects the permeate outlet of the oxygen separation device and the oxygen storage tank when the at least one valve is in the second position.

13. The system as set forth in claim 7, wherein the oxygen storage tank includes an outlet in fluid communication with the at least one valve, and an external inlet.

14. An oxygen separation device comprising:
a substrate having an air inlet end and a retentate outlet end;
an intake air passageway extending through the substrate from the air inlet end to the retentate outlet end;
an oxygen ion transport membrane supported on the substrate between the substrate and the intake air passageway, the oxygen ion transport membrane being adapted to separate oxygen atoms from the air in the intake air passageway and to transport the oxygen atoms to the substrate;
the oxygen ion transport membrane having a surface area per unit volume of at least 1 $cm^2/cm^3$.

15. The oxygen separation device as set forth in claim 14, wherein the substrate includes an outer wall surrounding the intake gas passageway.

16. The oxygen separation device as set forth in claim 15, further comprising a casing surrounding the outer wall and defining a collection space between the casing and the outer wall.

17. The oxygen separation device as set forth in claim 14, wherein the intake air passageway is further defined as a plurality of intake air passageways separated from each other by the substrate and each elongated along parallel axes, and further comprising an outer wall surrounding the intake gas passageways.

18. The oxygen separation device as set forth in claim 14, wherein the substrate is a type of ceramic, and the oxygen ion transport membrane is another type of ceramic.

19. The oxygen separation device as set forth in claim 14, further comprising a first electrode between the oxygen ion transport membrane and intake gas passageway, and a second electrode between the oxygen ion transport membrane and the substrate.

* * * * *